United States Patent
Klein et al.

(10) Patent No.: US 9,598,966 B2
(45) Date of Patent: Mar. 21, 2017

(54) METAL STRUCTURAL REINFORCEMENT FOR A COMPOSITE TURBINE ENGINE BLADE

(71) Applicant: SNECMA, Paris (FR)

(72) Inventors: Gilles Charles Casimir Klein, Mery sur Oise (FR); Jean-Michel Patrick Maurice Franchet, Paris (FR); Dominique Magnaudeix, Yerres (FR); Gilbert Michel Marin Leconte, Ozoir la Ferriere (FR)

(73) Assignee: SNECMA, Paris (FR)

( * ) Notice: Subject to any disclaimer, the term of this patent is extended or adjusted under 35 U.S.C. 154(b) by 322 days.

(21) Appl. No.: 14/397,730

(22) PCT Filed: Apr. 25, 2013

(86) PCT No.: PCT/FR2013/050917
§ 371 (c)(1),
(2) Date: Oct. 29, 2014

(87) PCT Pub. No.: WO2013/164532
PCT Pub. Date: Nov. 7, 2013

(65) Prior Publication Data
US 2015/0086378 A1    Mar. 26, 2015

(30) Foreign Application Priority Data
Apr. 30, 2012   (FR) ..................... 12 53977

(51) Int. Cl.
*F01D 5/28* (2006.01)
*F04D 29/02* (2006.01)
*F04D 29/32* (2006.01)

(52) U.S. Cl.
CPC ........... *F01D 5/282* (2013.01); *F04D 29/023* (2013.01); *F04D 29/324* (2013.01);
(Continued)

(58) Field of Classification Search
CPC ...... F01D 5/282; F04D 29/023; F04D 29/324; F05D 2230/232; F05D 2300/603;F05D 2300/702; F05D 2300/614; F05D 2300/6034; F05D 2300/6032; F05D 2300/174; F05D 2240/303; Y02T 50/673; Y02T 50/672
See application file for complete search history.

(56) References Cited

U.S. PATENT DOCUMENTS 4,738,594 A * 4/1988 Sato ...................... F04D 29/388
                                            416/213 A
5,674,370 A * 10/1997 DuPree .................... C25D 1/00
                                            205/114
(Continued)

FOREIGN PATENT DOCUMENTS

| EP | 1 908 919 A1 | 4/2008 |
| FR | 2 965 202 A1 | 3/2012 |
| GB | 2 484 726 A  | 4/2012 |

OTHER PUBLICATIONS

International Search Report issued Sep. 10, 2013 in PCT/FR2013/050917 filed Apr. 25, 2013.

*Primary Examiner* — Igor Kershteyn
(74) *Attorney, Agent, or Firm* — Oblon, McClelland, Maier & Neustadt, L.L.P.

(57) ABSTRACT

In structural reinforcement for a composite blade of a turbine engine, the reinforcement being for adhesively bonding to a leading edge of the blade and presenting over its full height a section that is substantially V-shaped, having a base that is extended by two lateral flanks, there is provided an assembly of a plurality of fiber bundles that is mounted in at least one housing in the base, which assembly defines fiber content that varies along the full height of the housing.

11 Claims, 1 Drawing Sheet

(52) U.S. Cl.
CPC .. *F05D 2230/232* (2013.01); *F05D 2240/303* (2013.01); *F05D 2300/174* (2013.01); *F05D 2300/603* (2013.01); *F05D 2300/6032* (2013.01); *F05D 2300/6034* (2013.01); *F05D 2300/614* (2013.01); *F05D 2300/702* (2013.01); *Y02T 50/672* (2013.01); *Y02T 50/673* (2013.01)

(56) References Cited

U.S. PATENT DOCUMENTS

| | | | |
|---|---|---|---|
| 5,725,354 | A | 3/1998 | Wadia et al. |
| 5,908,285 | A * | 6/1999 | Graff ................ C25D 1/10 205/67 |
| 6,471,485 | B1 * | 10/2002 | Rossmann ............ F01D 5/147 416/223 A |
| 8,088,498 | B2 * | 1/2012 | Smith ................. C23C 30/00 415/200 |
| 8,814,527 | B2 * | 8/2014 | Huth ................ B64C 11/205 416/224 |
| 8,858,182 | B2 * | 10/2014 | Schwarz ............... F01D 5/28 416/224 |
| 9,140,130 | B2 * | 9/2015 | Mironets .............. F01D 5/286 |
| 9,157,327 | B2 * | 10/2015 | Deal ................. F01D 5/147 |
| 2004/0184921 | A1 * | 9/2004 | Schreiber ............ B23P 15/04 416/229 R |
| 2008/0075601 | A1 | 3/2008 | Giusti et al. |
| 2012/0100006 | A1 | 4/2012 | Merriman et al. |

\* cited by examiner

METAL STRUCTURAL REINFORCEMENT FOR A COMPOSITE TURBINE ENGINE BLADE

BACKGROUND OF THE INVENTION

The field of the invention is that of turbine engines, and more particularly that of turbine engine blades made of composite material, and the present invention relates more particularly to metal structural reinforcement for the leading edge of a turbine engine blade.

It should be recalled that the leading edge corresponds to the front portion of an aerodynamic profile that faces the air stream and that splits the air flow into a pressure side air flow and a suction air flow. In contrast, the trailing edge corresponds to the rear portion of an aerodynamic profile where the pressure side and suction side flows rejoin.

Turbine engine blades, and in particular fan blades, are subjected to high levels of stress, in particular of mechanical stress. Thus, it is known to fit fan blades made of composite material with metal structural reinforcement extending over the full height of the aerodynamic profile and fitting closely to the shape of the leading edge, as mentioned in application FR 2 732 406 in the name of the Applicant. Such metal structural reinforcement serves to protect the set of composite blades in the event of a foreign body impacting against the fan, such as for example a bird, hail, or indeed stones. In particular, the metal structural reinforcement protects the leading edge of a blade made of composite material so as to avoid any risk of delamination, of fiber breakage, or indeed of damage resulting from loss of cohesion between fibers and a matrix.

In conventional manner; the metal structural reinforcement is a metal part made of titanium constituted by two stamped metal sheets of TA6V type alloy that are welded together at high temperature so as to form a single block of material. Unfortunately, such a part is heavy, but nevertheless it can happen that it is still not strong enough, particularly with increasing size of resin transfer molded (RTM) blades, in particular for turbine engines of very large dimensions, or when the length and the width of the blade increase substantially. Furthermore, it then presents material density that is unvarying, which is not well adapted to the shape of a leading edge, which shape varies along its height.

OBJECT AND SUMMARY OF THE INVENTION

In this context, the invention seeks to mitigate the above-mentioned drawbacks of present structural reinforcement, by proposing improved metal structural reinforcement of strength that is increased and of material density that can be modified in a manner that is simple and quick.

This object is achieved by structural reinforcement for a composite blade of a turbine engine, the reinforcement being for adhesively bonding to a leading edge of said blade and presenting over its full height a section that is substantially V-shaped, having a base that is extended by two lateral flanks, the reinforcement being characterized in that it includes, mounted in at least one housing in said base, an assembly of a plurality of bundles of fibers defining fiber content that varies along the full height of said housing.

Thus, the density of the reinforcement may be adapted to its shape, with higher density near the tip of the blade or on the contrary lower density near the root of the blade.

Advantageously, the fibers constituting a fiber bundle are held in position by at least one ring arranged at each end of said fiber bundle and said rings present diameters that increase with increasing number of fiber bundles that the rings hold together.

Preferably, the reinforcement is constituted by two portions for welding together, said at least one housing for receiving said fiber bundles being formed by joining together two mutually-facing grooves that are formed in respective ones of said two portions, the grooves being joined together during welding.

Depending on the embodiment under consideration, said assembly of a plurality of fiber bundles may include at least two concentric fiber bundles, a tubular bundle having a first length and an annular bundle covering part of the first fiber bundle and having a second length that is shorter than said first length, so as to define a first fiber content over an overlap length of the first and second fiber bundles, and a second fiber content over a remaining length, said overlap length possibly being formed by said second length and said remaining length being formed by said first length, or indeed said assembly may comprise four concentric fiber bundles, an annular fourth fiber bundle having a fourth length covering a portion of an annular third fiber bundle having a third length, itself covering a portion of said second fiber bundle having a second length, so as to define third and fourth fiber contents along the overlap lengths of the third and fourth fiber bundles, respectively.

Preferably, said housing forms a closed space extending in a longitudinal direction of said structural reinforcement and having a diameter that varies in successive stages to match the diameter of the fiber bundle it receives.

The invention also provides any blade including structural reinforcement as specified above and any turbine engine including at least one such blade.

BRIEF DESCRIPTION OF THE DRAWING

Other characteristics and advantages of the present invention appear from the following description made with reference to the accompanying drawing which show an embodiment having no limiting character, and in which.

DETAILED DESCRIPTION OF AN EMBODIMENT

Figure 1:
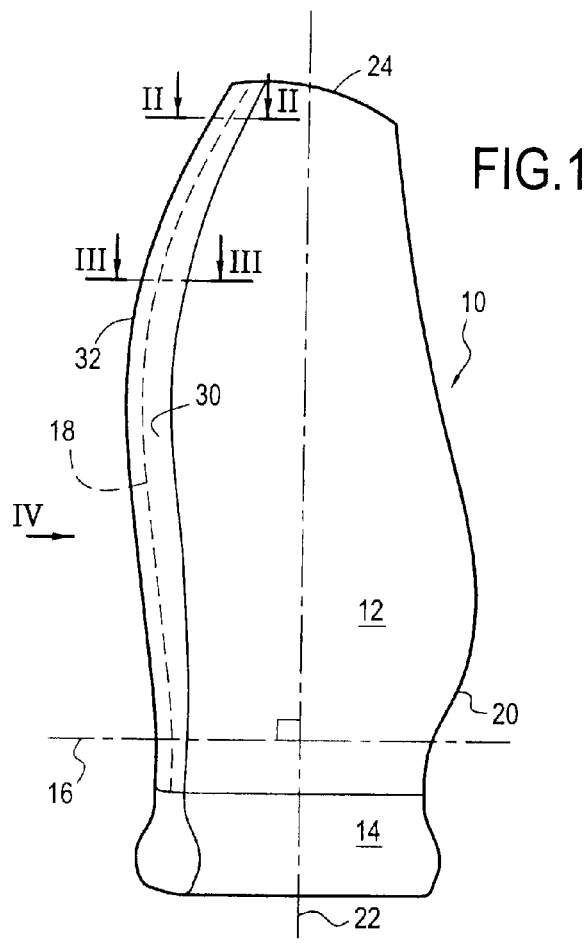
FIG. 1 shows a turbine engine fan blade in side view.

FIG. 1 is a side view of a blade, e.g. a moving blade of a turbine engine fan (not shown), that includes metal structural reinforcement of its leading edge in accordance with the invention. The blade 10 comprises an aerodynamic surface or airfoil 12 that is secured to a root 14 and that extends in an axial first direction 16 between a leading edge 18 and a trailing edge 20 and in a radial second direction 22 substantially perpendicular to the first direction 16 between said root 14 and a tip 24 of the blade. The side faces of the airfoil 12 connecting together the leading edge 18 and the trailing edge 20 constitute a suction side face 26 and a pressure side face 28 of the blade.

Conventionally, the airfoil 12 is made of a composite material obtained by draping or shaping a woven fiber fabric. By way of example, the composite material used may be made up of an assembly of woven carbon fibers and an epoxy resin matrix, the assembly being formed by molding using a resin transfer molding (RTM) type injection method.

The blade 10 also has structural reinforcement 30 adhesively bonded to the leading edge of the blade and extending both in the first direction 16 beyond the leading edge 18 and in the second direction 22 between the root 14 and the tip 24 of the blade.

Figure 2:
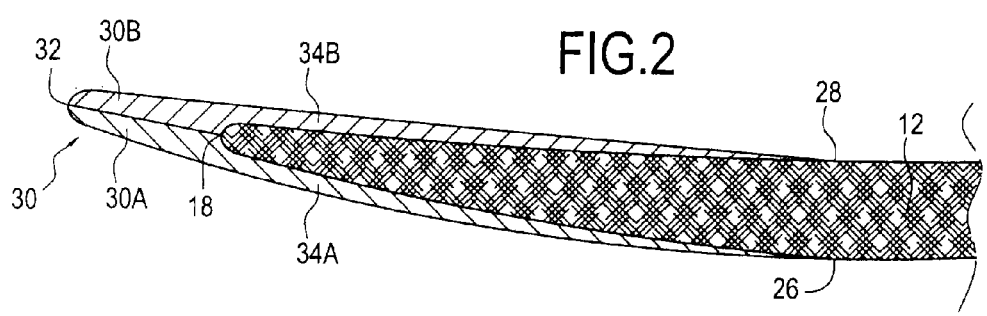
FIGS. 2 and 3 are fragmentary sections of the FIG. 1 blade showing metal structural reinforcement of the leading edge in accordance with the invention at two different heights.

As shown in FIG. 2, the structural reinforcement 30 fits closely to the shape of the leading edge 18 of the airfoil 12 of the blade 10 that it protects in order to constitute the leading edge 32 of the blade. Conventionally, this structural reinforcement 30 is a single-piece part, or else, as shown, it may be in the form of two portions 30A and 30B for welding together and comprising a substantially V-shaped section presenting a base of external profile that forms the leading edge 32 of the blade and of rounded internal profile suitable for fitting closely to the rounded shape of the leading edge 18 of the airfoil 12. This base is extended by two lateral flanks 34A and 34B that fit closely to the pressure side 26 and to the suction side 28 of the blade and each presenting a profile that is tapering, i.e. becoming thinner going towards the trailing edge of the blade.

The structural reinforcement 30 is made of metal, and preferably of a titanium-based alloy of TA6V type. This material presents great capacity to absorb energy due to impacts. The structural reinforcement 30 is adhesively bonded to the airfoil 12 by means of adhesive known to the person skilled in the art, such as for example cyanoacrylic adhesive or epoxy adhesive.

Figure 3:
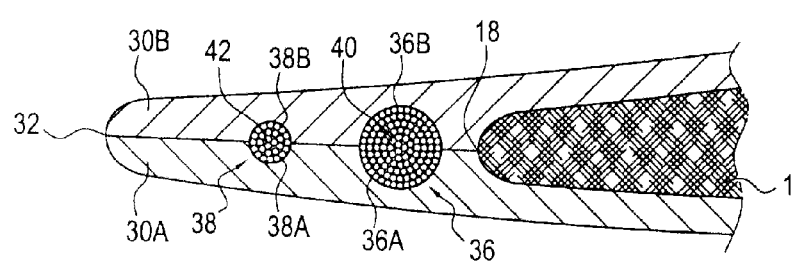

In the invention, and as shown in FIG. 3, the structural reinforcement 30 includes, received in at least one housing 36, 38 in its base (there being two housings in the example shown, without this number being limiting), respective assemblies 40, 42, each comprising a plurality of fiber bundles defining fiber content that varies all along the height of the housing. Such a housing extends along the second direction 22 of the blade (corresponding to a longitudinal direction for the reinforcement) but without opening out into the root 14 or the tip 24 of the blade, such that the integrity and the continuity of the assembly fibers 40, 42 can be guaranteed within this closed space from which no fiber can escape. In addition, since the fibers are not held together by welding, putting the assembly into place does not lead to any fibers breaking, in particular in shear, which could constitute a source for a breakage starter.

It should be observed that because the structural reinforcement 30 is built up from two portions 30A and 30B, the housing 36, 38 is formed by joining together two grooves 36A & 36B and 38A & 38B when these two portions are welded together, which grooves face each other and are formed in respective ones of the two portions so as to form respective closed spaces containing the assemblies of fiber bundles 40 and 42 once the two portions are welded together.

The section of a housing (and thus a fortiori of the two grooves making it up) is advantageously circular (i.e. semi-circular for each groove), but it could nevertheless be modified easily, depending on the mechanical dimensioning or geometrical requirements for the reinforcement, and for example it could present a shape that is oval, polygonal, etc.

Figure 4:
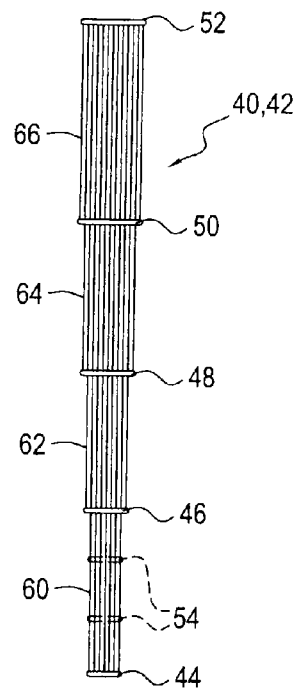
FIG. 4 shows an assembly of fiber bundles that is put into place in a housing at the base of the metal structural metal reinforcement of FIG. 3 in order to vary the density of material.

As shown in FIG. 4, the fibers making up the fiber bundles of the assemblies 40, 42 are held in position by rings 44, 46, 48, 50, 52 that are arranged at least at each of the ends of the fiber bundles (it being possible to add additional intermediate rings 54 should that be necessary). More precisely, in order to match the profile of the airfoil 12 as closely as possible, an assembly is provided that is made up of four fiber bundles, thereby making it possible to obtain a number of fibers that decreases in successive stages on going from the tip 24 of the blade to its root 14. To do this, a tubular central first fiber bundle 60 having a first length that corresponds to the total length to be filled in, is itself covered in part, i.e. over a second length that is shorter than the preceding length, by an annular second fiber bundle 62, in turn covered in part over a third length that is shorter than the preceding length by an annular third fiber bundle 64, itself covered in part, over a fourth length that is shorter than the preceding length, by an annular fourth fiber bundle 66. Three overlap lengths are thus defined in which the fiber contents differ from the fiber content of the first fiber bundle, specifically because of this overlapping. In order to hold the fibers in position in their respective bundles, the rings are of diameters that increase with increasing number of fiber bundles that they hold, and in order to ensure that these fiber bundles are themselves held without slack, the housing has a diameter that varies in successive stages to match the diameter of the fiber bundle it receives.

By way of example, the first fiber bundle may contain 40 SiC yarns of length equal to practically the total length of the reinforcement and held together by a set of rings having an inside diameter of 3 mm, the second fiber bundle may contain 30 yarns extending over 70% of practically the total length of the reinforcement that are held together by a set of rings having an inside diameter of 3.6 mm, the third fiber bundle may have 30 yarns extending over 50% of practically the total length of the reinforcement that are held together by a set of rings having an inside diameter of 4 mm, and the fourth and last fiber bundle may have 30 yarns extending over 30% of practically the total length of the reinforcement held together by a set of rings having an inside diameter of 4.2 mm. The assembly as formed in this way is mounted in a housing of TA6V titanium structural reinforcement for the leading edge of a blade made of carbon fibers and an epoxy resin matrix.

Naturally, the above example is given purely by way of illustration, and the number of bundles, their lengths, and their fiber contents should be selected as a function of the characteristics required for the structural reinforcement 30.

Although the above description is illustrated by means of a turbine engine fan blade, it should be observed that the invention is also applicable to making metal structural reinforcement for reinforcing a leading edge or a trailing edge of a blade of any type of turbine engine, whether for terrestrial or aviation purposes, and in particular a helicopter turboshaft engine or an airplane turbojet engine, and the invention is also suitable for propellers such as the propellers of unducted pairs of contrarotating fans. The invention is also applicable to making any other engine elements, e.g. solid structural parts such as casings, whenever it is desired to modify density in local manner.

The invention claimed is:

1. A structural reinforcement for a composite blade of a turbine engine, the reinforcement being for adhesively bonding to a leading edge of said blade and presenting over its full height a section that is substantially V-shaped, having a base that is extended by two lateral flanks, said base comprising at least one housing extending along a longitudinal direction of said structural reinforcement, the reinforcement including, mounted in said at least one housing, an assembly of a plurality of bundles of fibers defining fiber content that varies along the full height of said housing.

2. The structural reinforcement according to claim 1, wherein the fibers making up the fiber bundles are held in position by rings arranged at least at each end of said fiber bundles.

3. The structural reinforcement according to claim 2, wherein said rings present diameters that increase with increasing number of fiber bundles that they serve to hold together.

4. The structural reinforcement according to claim 1, wherein it is made up of two portions for welding together, said at least one housing for receiving said fiber bundles being formed by joining together two mutually-facing grooves that are formed in respective ones of said two portions, the grooves being joined together during welding.

5. The structural reinforcement according to claim 4, wherein said housing includes a diameter that varies in successive stages to match the diameter of the fiber bundle it receives.

6. The structural reinforcement according to claim 1, wherein said assembly of a plurality of fiber bundles includes at least two concentric fiber bundles, a tubular bundle having a first length and an annular bundle covering part of the first fiber bundle and having a second length that is shorter than said first length, so as to define a first fiber content over an overlap length of the first and second fiber bundles, and a second fiber content over a remaining length.

7. The structural reinforcement according to claim 6, wherein said overlap length is formed by said second length and said remaining length is formed by said first length minus said second length.

8. The structural reinforcement according to claim 6, wherein said assembly of fiber bundles comprises four concentric fiber bundles, an annular fourth fiber bundle having a fourth length covering a portion of an annular third fiber bundle having a third length, itself covering a portion of said second fiber bundle having a second length, so as to define third and fourth fiber contents along the overlap lengths of the third and fourth fiber bundles, respectively.

9. The structural reinforcement according to claim 1, wherein said housing forms a closed space.

10. A turbine engine blade including structural reinforcement according to claim 1.

11. A turbine engine including at least one blade according to claim 10.

* * * * *